(12) United States Patent
Seabrook

(10) Patent No.: US 12,215,946 B2
(45) Date of Patent: Feb. 4, 2025

(54) TACTICAL TURRET WITH INTEGRATED TRACKING

(71) Applicant: Nathan Seabrook, Minneapolis, MN (US)

(72) Inventor: Nathan Seabrook, Minneapolis, MN (US)

(*) Notice: Subject to any disclaimer, the term of this patent is extended or adjusted under 35 U.S.C. 154(b) by 32 days.

(21) Appl. No.: 18/345,450

(22) Filed: Jun. 30, 2023

(65) Prior Publication Data

US 2023/0341209 A1 Oct. 26, 2023

Related U.S. Application Data

(63) Continuation-in-part of application No. 17/473,033, filed on Sep. 13, 2021, now Pat. No. 11,719,515, which is a continuation-in-part of application No. PCT/US2020/021982, filed on Mar. 11, 2020.

(60) Provisional application No. 62/816,578, filed on Mar. 11, 2019.

(51) Int. Cl.
*F41A 27/18* (2006.01)
*F41H 5/20* (2006.01)
*G01S 19/25* (2010.01)

(52) U.S. Cl.
CPC ............ *F41A 27/18* (2013.01); *F41H 5/20* (2013.01); *G01S 19/25* (2013.01)

(58) Field of Classification Search
CPC ...... F41H 5/20; F41H 5/08; F41H 7/04; F41A 27/18; F41A 27/10
See application file for complete search history.

(56) References Cited

U.S. PATENT DOCUMENTS

| | | | |
|---|---|---|---|
| 3,457,827 A * | 7/1969 | Sumrall | F41A 27/18 250/342 |
| 3,847,053 A | 11/1974 | Ubelacker | |
| 9,194,664 B1 | 11/2015 | Smith | |
| 11,719,515 B2 * | 8/2023 | Swain | F41A 27/10 89/36.05 |
| 2015/0233679 A1 | 8/2015 | Seabrook | |

* cited by examiner

*Primary Examiner* — J. Woodrow Eldred
(74) *Attorney, Agent, or Firm* — GRUMBLES LAW PLLC; Bryan Kravis

(57) ABSTRACT

A ball turret includes a turret shell having a rear portion and a front portion. An integrated GPS tracking device. The rear portion and the front portion are assembled to form the turret shell. The shell includes a block assembly configured to mount to a mounting element of a weapon system, and a yoke carriage assembly configured to receive and mount to the block assembly. A number of guide rods within the turret shell are configured to mount the yoke carriage assembly thereto and to provide a recoil shock absorber in response to a discharge of the weapon system. The yoke carriage assembly is releasably mounted to the block assembly.

4 Claims, 8 Drawing Sheets

TACTICAL TURRET WITH INTEGRATED TRACKING

BACKGROUND OF THE INVENTION

The present disclosure relates to ballistic turrets. Specifically, the present disclosure relates to ballistic balls used for weapon deployment in protective shields and the like.

Law enforcement, military, special operations forces, and civilian high-threat security contractors have a need for protective gear when they respond to active and mass shooter situations, acts of terrorism, military operations, high-threat warrants, arrests, and other acts of violence that require specialized protective equipment.

Conventional ballistic shields typically require that the operator expose his or her hand or arm around an edge of a shield to deploy a weapon system. In addition, conventional ballistic shields often require the operator to return fire from a position in which the head of the operator is not aligned with the weapon site.

In other situations involving the use of shields, such as from inside vehicles with bullet-resistant glass, through doors or other barricades, and the like, deploying a weapon system often requires that security and safety be sacrificed by lowering a window or screen, or partially opening a door, or the like. The present disclosure provides an improved ballistic shield and related methods that address the above shortcomings and others, as well as current tactical updates to the invention.

There is a need in the art for a weapon deployment system for use with and through protective shields, such as portable, lightweight ballistic shields, bullet-resistant windows and doors, and other barricades, that provide added protection to operators using such devices.

SUMMARY OF THE INVENTION

One general aspect includes a ball turret. The ball turret also includes a turret shell having a rear portion and a front portion, the rear portion, and the front portion assembled to form the turret shell. A GPS transmitter and receiver may be integrated into the ball turret. The turret also includes a block assembly configured to mount to a mounting element of a weapon system. The turret also includes a yoke carriage assembly configured to receive and mount to the block assembly. The turret also includes a plurality of guide rods within the turret shell, the guide rods configured to mount the yoke carriage assembly thereto and to provide a recoil shock absorber in response to a discharge of the weapon system, the block assembly releasably mounted to the yoke carriage assembly. An additional embodiment may include a GPS transmitter and receiver that is structured and configured to receive a signal from the Global Position System. Such an embodiment may also be capable of calculating a global location of the ball turret and may then be able to further transmit that calculated location to a distant receiver.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention, and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

DETAILED DESCRIPTION

The present disclosure is directed to a tactical turret for deployment in protection and defense equipment, such as but not limited to ballistic shields, windows, doors, barricades, and the like.

In one embodiment, a tactical turret is a ball turret mountable in an opening and capable of rotation and with at least one of an aiming laser, a video camera, a disruptor light/flashlight, and a quick-release sleeve system that enables various pistol platforms to interchangeably fit and lock into an enhanced tactical stabilization platform of the ball turret is provided. In one embodiment, a locking piece referred to as a "stinger" connects to a pistol guard and then mates into position with a locking connector in the ball turret. In one embodiment, the ball turret houses a high-density green laser for painting and aiming at a target, a high-density strobe light/flashlight to provide light and use as an LED disruptor light to disorient possible attackers, and a micro camera that records all aspects of the use of the turret.

Use of the ball turret in, for example, a ballistic shield or the like, provides protection to a user's entire upper body and enables a user to fire various weapon platforms from a safe position in which the head of the user is better aligned with the weapon site and the user's arm is protected behind the shield. In addition, the shield and turret allow the user to engage targets at further distances from longer stand-off distances, thus affording greater safety to the operator.

Figure 1:
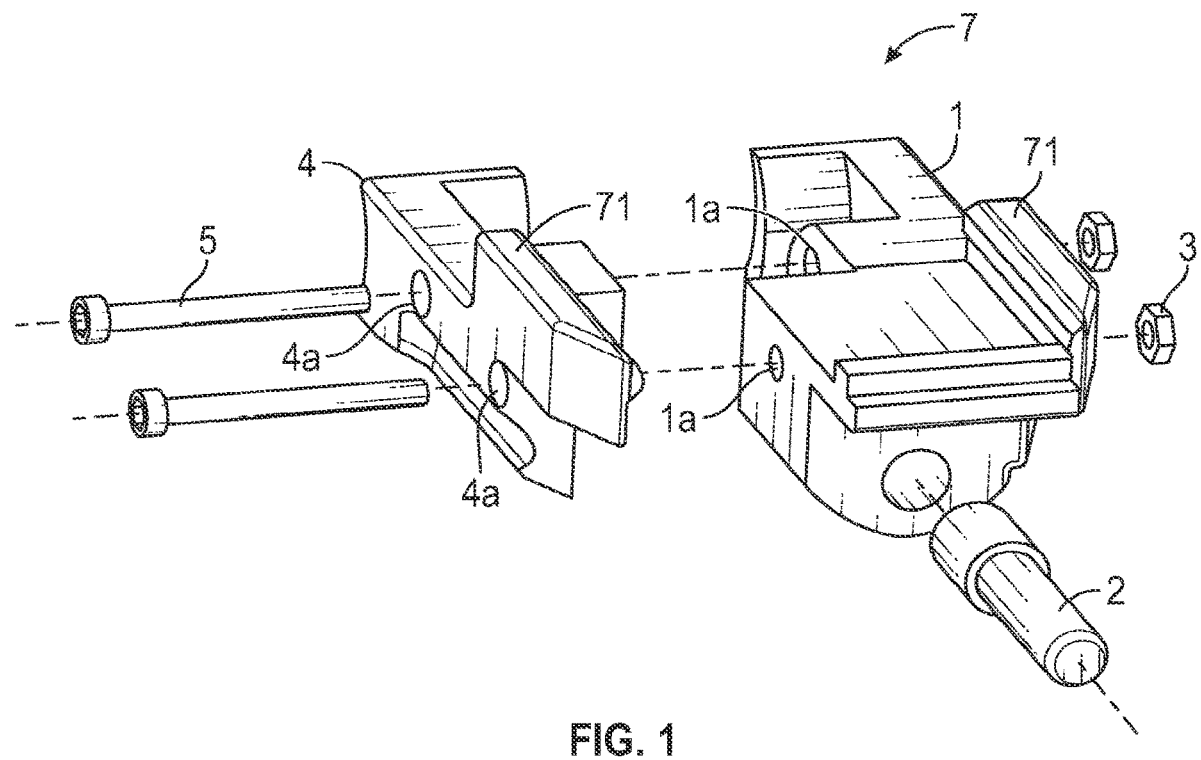
FIG. 1 is an exploded view of a Picatinny block assembly according to an embodiment of the present disclosure.

FIG. 1 is an exploded view of a Picatinny enabled block assembly 7 according to an embodiment of the present disclosure. A Picatinny device attaches in a known fashion on a Picatinny rail of any weapon system employing it. Block assembly 7 comprises in one embodiment, a stand-off block 1. Stand-off block 1 is mounted on a weapon and around a trigger guard of the weapon platform (6, see below) to retain the weapon platform inside a tactical turret (70, see below). The stand-off block is used to locate and control movement and accuracy of the weapon platform inside a tactical turret. Stinger pin 2 is mounted into stand-off block 1. The stinger pin 2 locates and is restrained in a ball-cam collet (see FIG. 3). A clamp plate 4 mates with stand-off block 1, and is secured thereto with retaining bolts or screws 5 that mount through openings 1a and 4a of stand-off block 1 and clamp plate 4, respectively. Retaining bolts or screws 5 are in one embodiment secured in openings 1a and 4a with retaining nuts 3 that thread onto bolts or screws 5 to mate stand-off block 1 and clamp plate 4. Rails 71 on the stand-off block 1 and clamp plate 4 are suitable for mounting the block assembly 7 to a Picatinny rail of a weapon system. It should be understood that while a Picatinny rail system mount is discussed, other mounting systems may be employed without departing from the scope of the disclosure.

Figure 2:
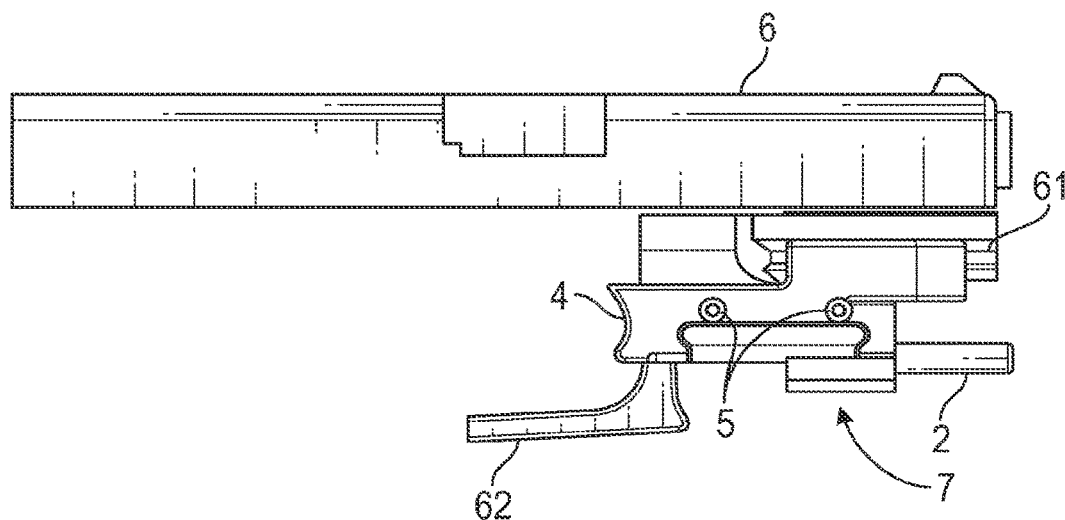
FIG. 2 is a side view of a weapon system mounted to the Picatinny block assembly of FIG. 1.

FIG. 2 is an illustration of a weapon system 6, such as a handgun, Taser, long gun, or the like, engaged with the block assembly 7. The weapon system 6 includes a Picatinny rail 61 and a trigger guard 62. The block assembly 7 has rails 71 that engage the Picatinny rail 61 of weapon system 6 for mounting thereto.

Figure 3:
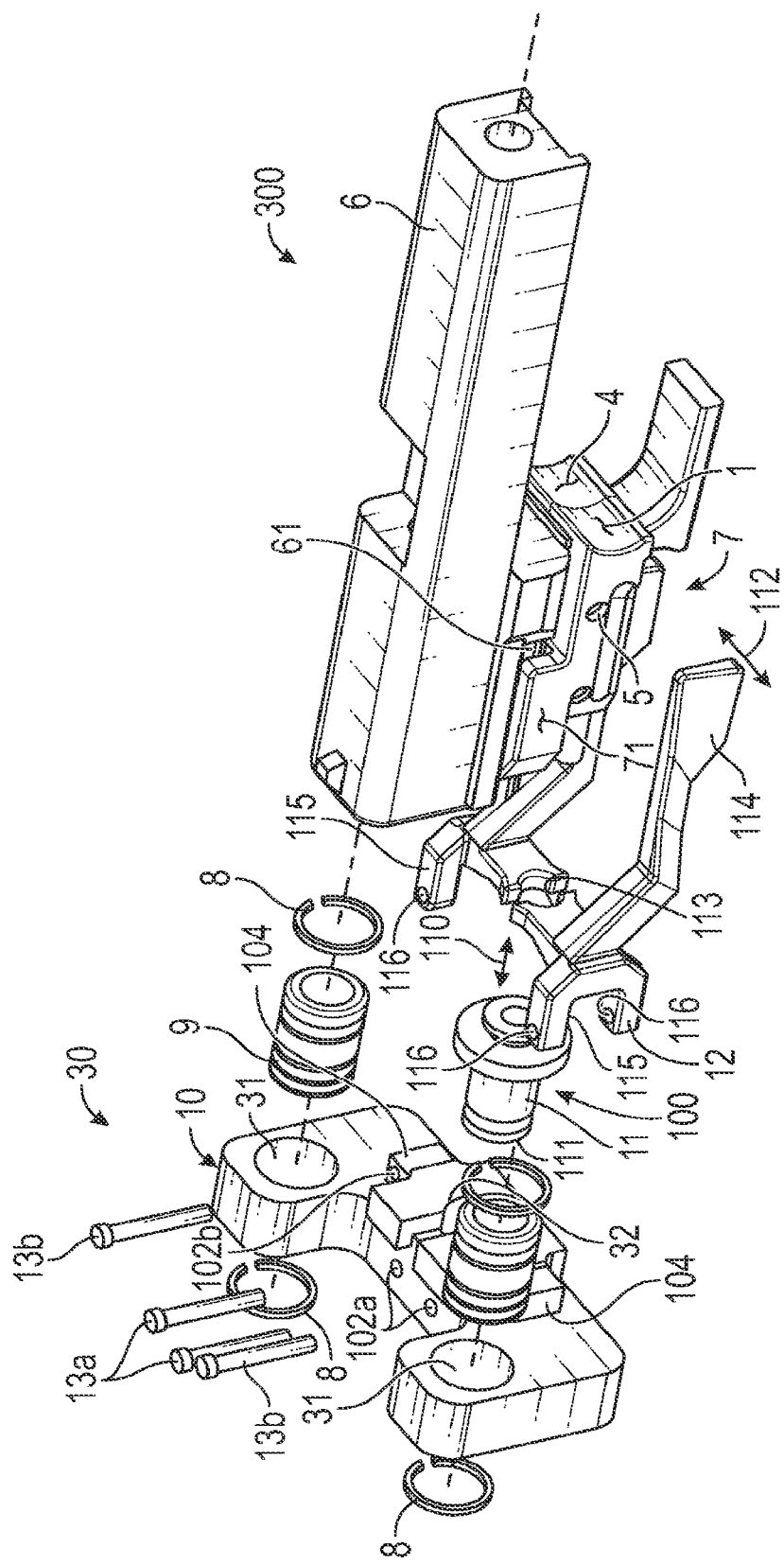
FIG. 3 is an exploded perspective view of a system including a yoke carriage assembly according to an embodiment of the present disclosure in relation to the weapon system of FIG. 2.

FIG. 3 is an exploded perspective view of a system 300, including a yoke carriage assembly 30 according to an embodiment of the present disclosure in relation to the weapon system 6 and block assembly 7 of FIGS. 1-2. Yoke carriage assembly 30 comprises a yoke frame 10 having openings 31 sized to fit bushings 9 therein, and an opening 32 sized to fit a collet 11 therein. Yoke frame 10 further includes restraining holes 102a and 102b that are used to assist in the retention of bushings 9 and finger release arms 12 (discussed below) in yoke frame 10, respectively.

Yoke frame 10 openings 31 receive bushings 9. Retaining rings 8 are used at either end of bushings 9 to assist in the retention of bushings 9 in openings 31. Bushings serve to stabilize in a controlled fashion motion of the yoke carriage assembly 30 on the rails 61 when the attached weapon system 6 is discharged. Recoil energy of the weapon system is dampened by the yoke carriage assembly 30.

Collet 11 is sized in one embodiment to fit yoke frame 10 opening 32. Collet 11 has an opening 111 (see FIG. 4) that is sized to fit stinger pin 2 when the yoke carriage assembly 30 is mounted to the block assembly 7 and weapon system 6. Collet 11 comprises a spring-loaded taper ball assembly that retains kinetic energy from a discharge force of the weapon system 6 when the stinger pin 2 is mounted within opening 111 of collet 11. Collet 11 further comprises a sliding feature 100 that moves in the direction of arrow 101. Sliding feature 100 moves forward to open the taper ball mechanism of collet 11 to release stinger pin 2 when acted on by stubs 113 of release arms 12 (described below). Stubs 113 of release arms 12, when pivoted as shown by arrow 112, press on sliding feature 100, moving it forward to release the stinger pin 2 when the stinger pin is engaged in opening 111 of collet 11.

Release arms 12 are mounted to yoke frame 10 in a pivotable manner. Release arms 12 pivot in the direction of arrow 112, and are pivotable by pressing of a user's fingers or hand against pressure arms 114 of release arms 12. Release arms 12 have mounting forks 115 each having openings 116 which are aligned with openings 102b in mounting blocks 104 of yoke frame 10. Release arms pivot about an axis of retaining pins 13b which extend through openings 116 and 102b.

Figure 4:
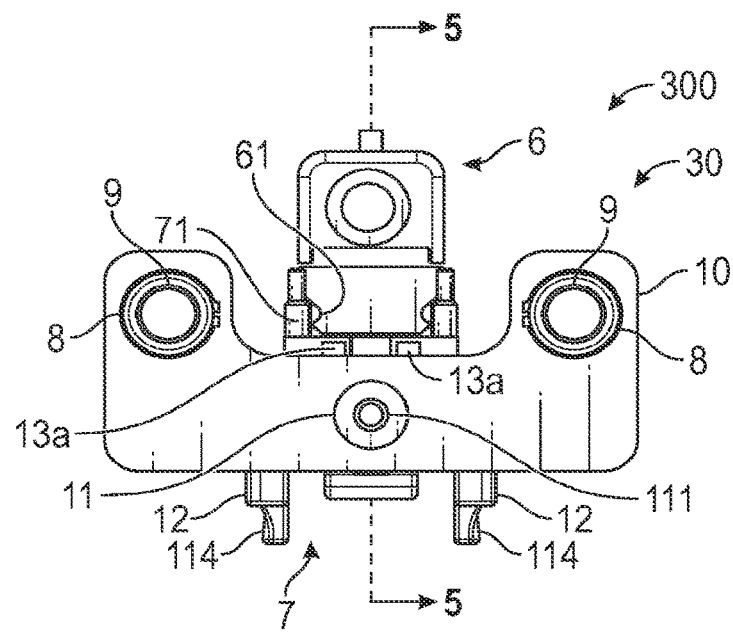
FIG. 4 is a front elevation view of the system of FIG. 3.
Figure 5:
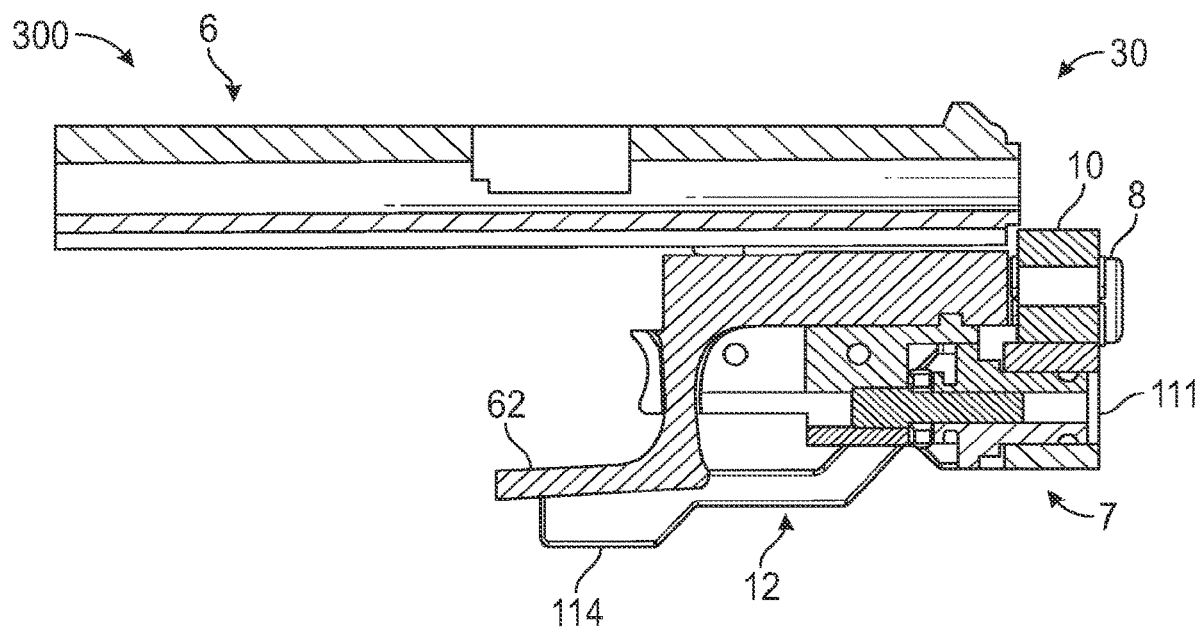
FIG. 5 is a partial cutaway side elevation view of the system of FIG. 3.

FIG. 4 is a front elevation view of the assembled system 300 as shown in exploded view in FIG. 3. FIG. 5 is a section view of the system 300 taken along lines 5-5 of FIG. 4.

Figure 6:
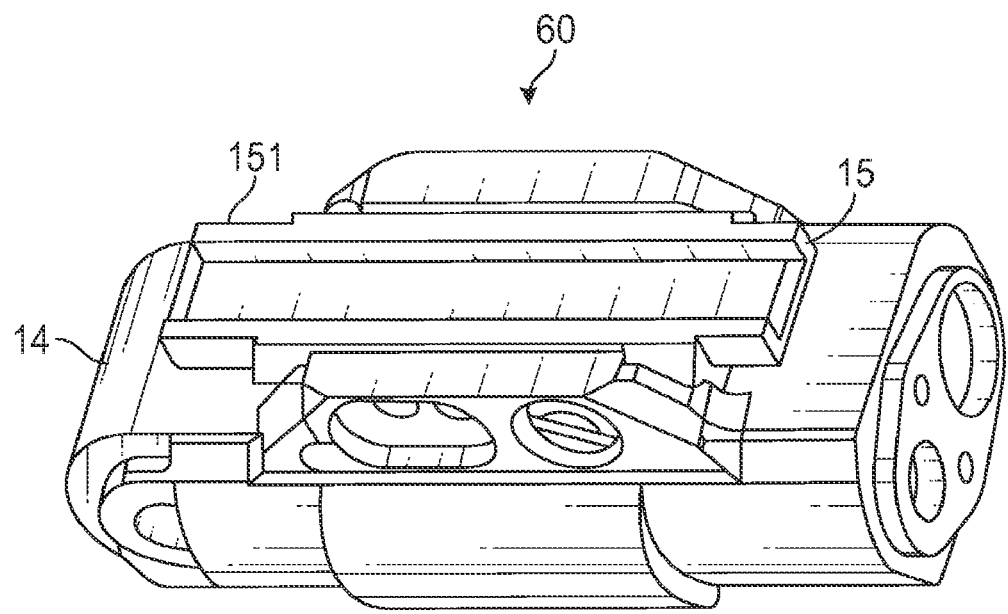
FIG. 6 is a perspective view of a laser assembly amenable for use with embodiments of the present disclosure.

A laser assembly 60 suitable for use with embodiments of the present disclosure is shown in perspective form in FIG. 6. Laser assembly 60 comprises a laser/strobe/camera (LSC) unit 14 containing at least one of a laser, disruptor light/flashlight, and camera. LSC unit in one embodiment contains electronic devices to record what a user is aiming at and any conversations taking place, strobe light for confusion or illumination, and a laser beam for accurately aiming weapon system 6. Laser assembly 60 further comprises a laser attachment plate 15 coupled to the laser/strobe/camera unit 14, having a mounting system 151 to securely mount the laser assembly 60 into tactical turret 70 (described below).

Figure 7:
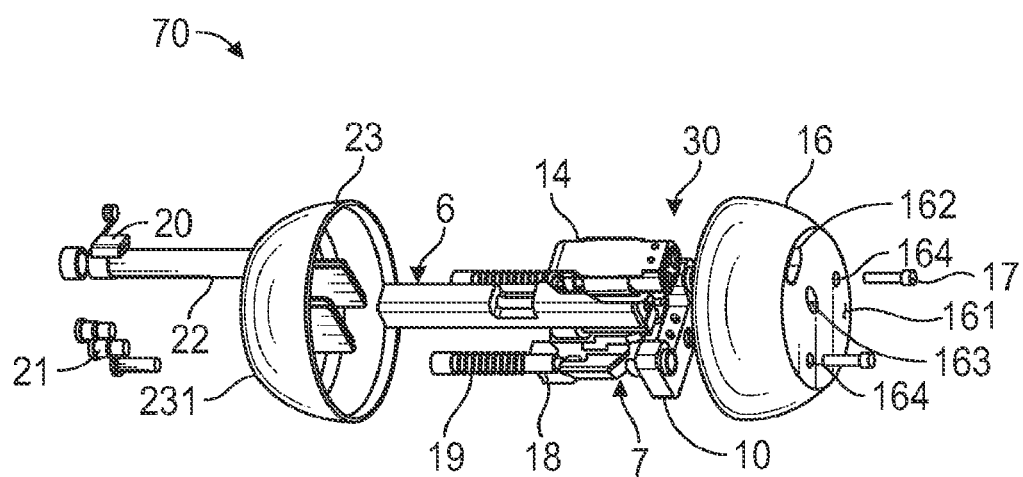
FIG. 7 is an exploded side view of a tactical turret assembly according to an embodiment of the present disclosure.

FIG. 7 is an exploded view of a ball turret/tactical turret 70 which houses system 300 (weapon system 6, block assembly 7, and yoke carriage assembly 30) and laser assembly 60 for deployment of weapon system 6 through, for example, a ballistic shield, window, door, barricade, or the like. Tactical turret 70 comprises in one embodiment turret front portion 16 and rear portion 23 which fit together to form a turret shell. Turret front portion 16 has in one embodiment, a semi-spherical like shape with a flattened front face 161. In one embodiment, turret rear portion 23 has a semi-spherical line shape with a flattened face 231. When assembled, the tactical turret has a spherical-like shape that allows the assembled turret 70 to roll, pitch and yaw within a mount in a manner in which the operator of the weapon system 6 housed in the turret 70 can successfully remain protected and return fire with any ballistic ordinate being used. When the turret is mounted in a shield, window, door, barricade, or the like, the operator is afforded the protection of the shield, window, door, barricade, or the like, and does not have to reach around the protection to deploy the weapon system 6.

Front portion 16 has openings therein for various components of system 300. Opening 162 allows laser assembly access to the environment forward of tactical turret 70. Opening 163 allows passage of ordnance from weapon system 6. Openings 164 receive retainer bolts/screws 17 that mate with openings 234 (see FIG. 10) in the rear portion 23 to secure front portion 16 and rear portion 17 of tactical turret 70 together. Release arms 12 of the system 300 extend out through an opening in the rear face 231 of rear portion 23.

Guide rods 18 within a center space between the front portion 16 and rear portion 23 are positioned to be fitted into the bushings 9 of yoke carriage assembly 30 when the turret 70 is assembled. Guide rods 18 carry shock absorbers 19, in one embodiment springs. Shock absorbers 19 provide a counter to recoil from firing the weapon system 6. This reduces the effects of recoil, and allows greater control of the weapon system 6.

LSC unit 14 is couplable to power supply 22 and universal serial bus connector port 20 to receive power from power supply 22, and to transmit information from LSC unit to an external system. A switch 21 is mounted in the rear face 231 of rear portion 23 for controlling an on/off condition of the LSC unit 14.

Figure 8:
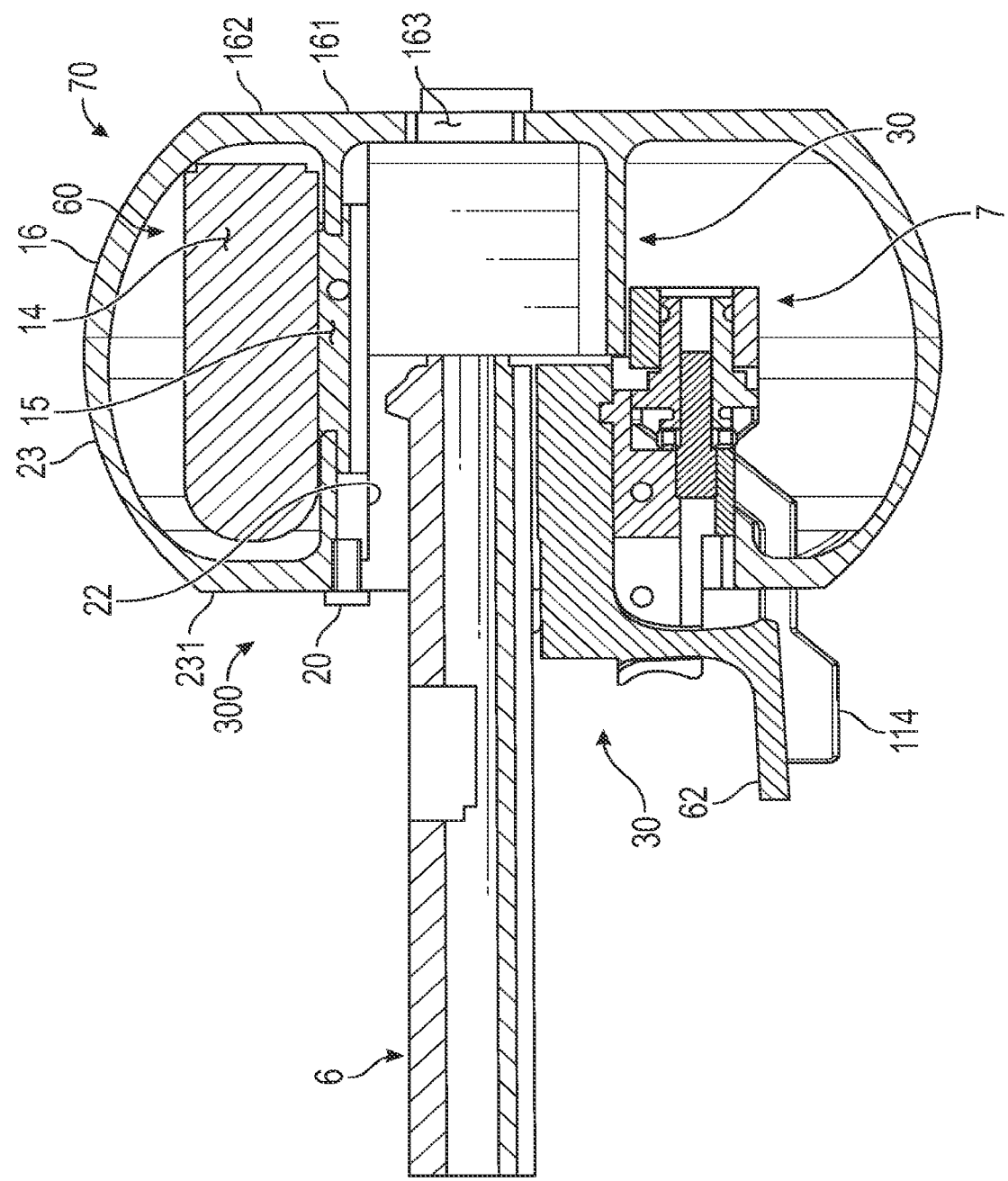
FIG. 8 is a partial cutaway side view of the tactical turret of FIG. 7.
Figure 10:
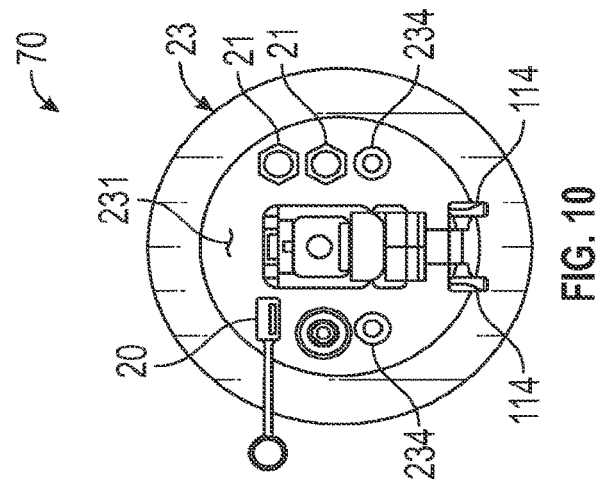
FIG. 10 is a front elevation view of the assembled tactical turret of FIG. 7.
Figure 9:
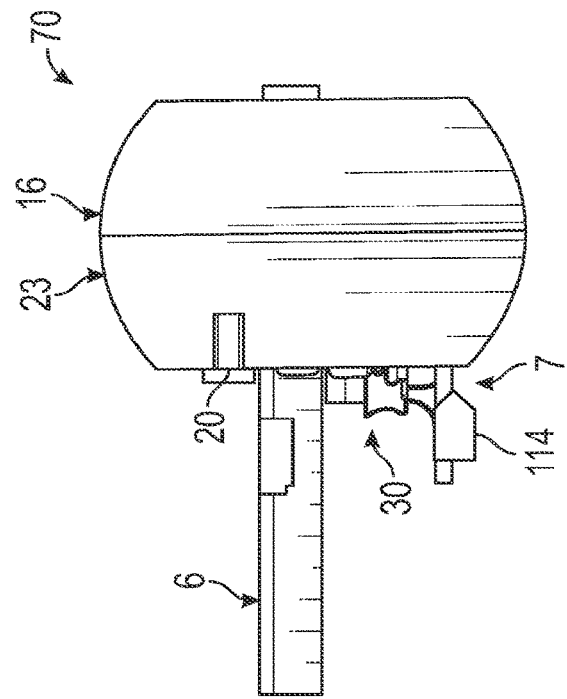
FIG. 9 is a side elevation view of the assembled tactical turret of FIG. 7.
Figure 11:
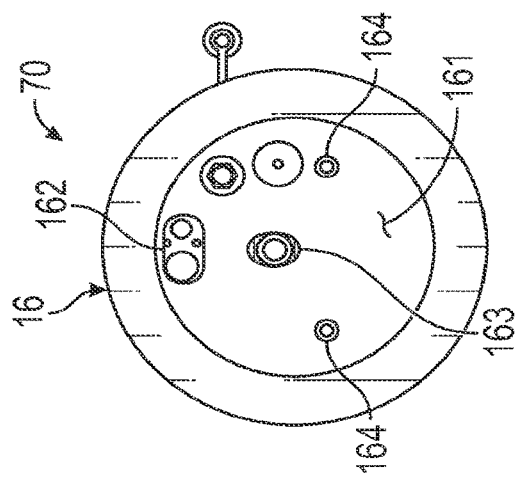
FIG. 11 is a rear elevation view of the assembled tactical turret of FIG. 7.

FIG. 8 is a section view of an assembled tactical turret 70 according to an embodiment of the disclosure. FIGS. 9, 10, and 11 show, respectively, a side elevation view, a rear elevation view, and a front elevation view of an assembled tactical turret 70.

Figure 12:
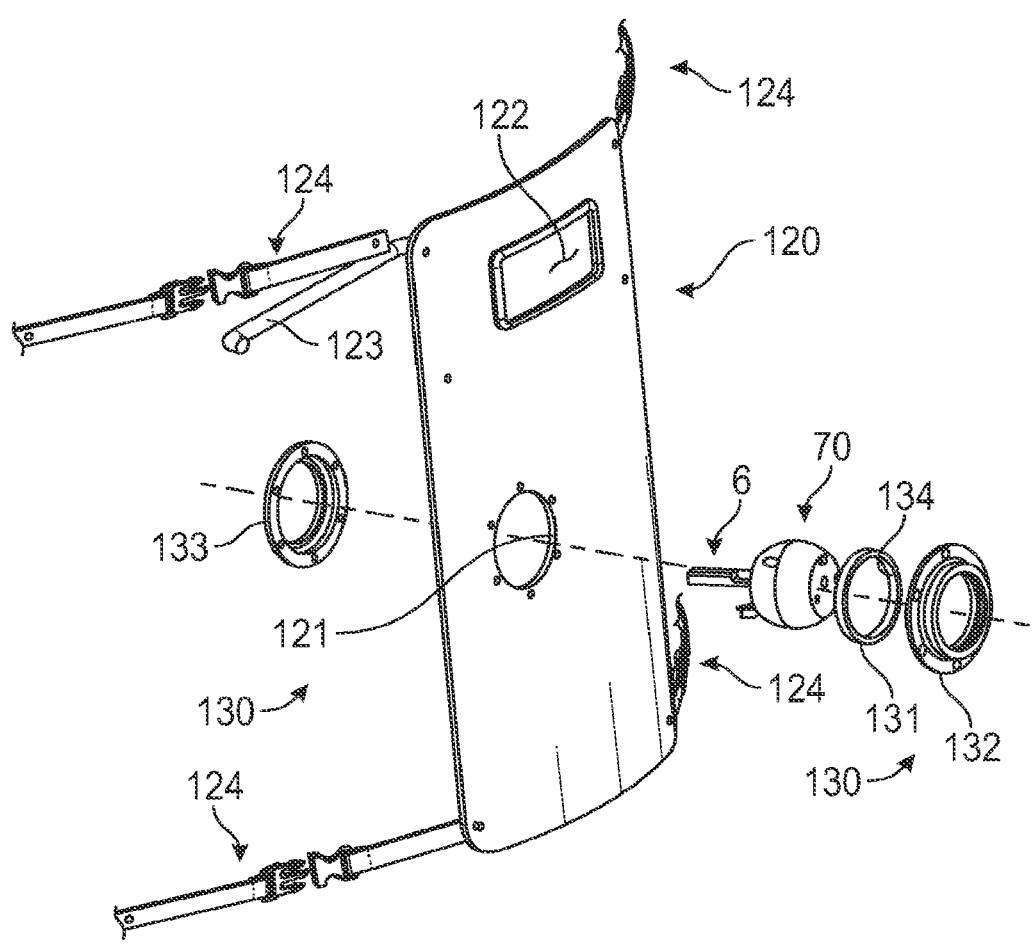
FIG. 12 is a front elevation view of a ballistic shield employing a tactical turret according to an embodiment of the present disclosure.

FIG. 12 is an exploded view of a ballistic shield 120 in which a tactical turret 70 embodiment may be mounted. Mounting system 130 for tactical turret 70 mounts the tactical turret 70 in an opening 121 of shield 120. Mounting system 130 comprises in one embodiment a front bezel 131 and front and rear mounting plates 132 and 133, respectively. Tactical turret 70 fits into opening 143 of bezel 131. Bezel 131 fits opening 121 of shield 120. Front and rear mounting plates 132 and 133 secure turret 70 and bezel 131 within opening 121, such as with bolts or screws (not shown). Shield 120 is shown with a transparent ballistic material window 122, a handle 123 mounted to an inside (facing away from a threat) of the shield 120, and straps 124 for securing the shield 120 to a user.

When the tactical turret 70 is mounted to the shield 120, a weapon system 6 mounted to a block assembly 7 may be mounted to the yoke carriage assembly 30 carried in the turret 70 as described above. The turret 70 is movable and rotatable for pitch, roll, and yaw adjustment of the weapon system, while providing protection for the user from exposure of an arm, hand, head, or the like from the protection of the shield 120. Aiming of the weapon system 6 is facilitated by the LSC unit 14 and window 122. The weapon system aim is adjustable without the user being exposed to incoming weapons fire.

Figure 13:
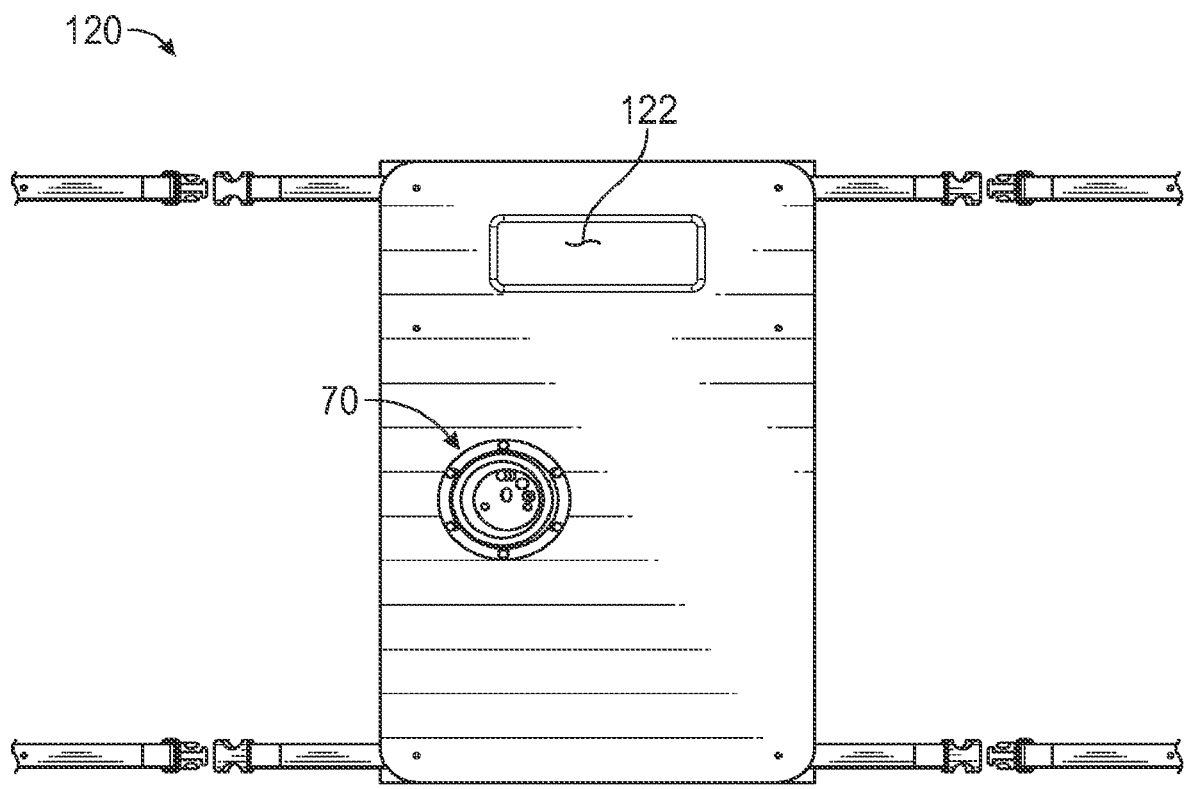
FIG. 13 is a rear elevation view of the ballistic shield of FIG. 12.
Figure 14:
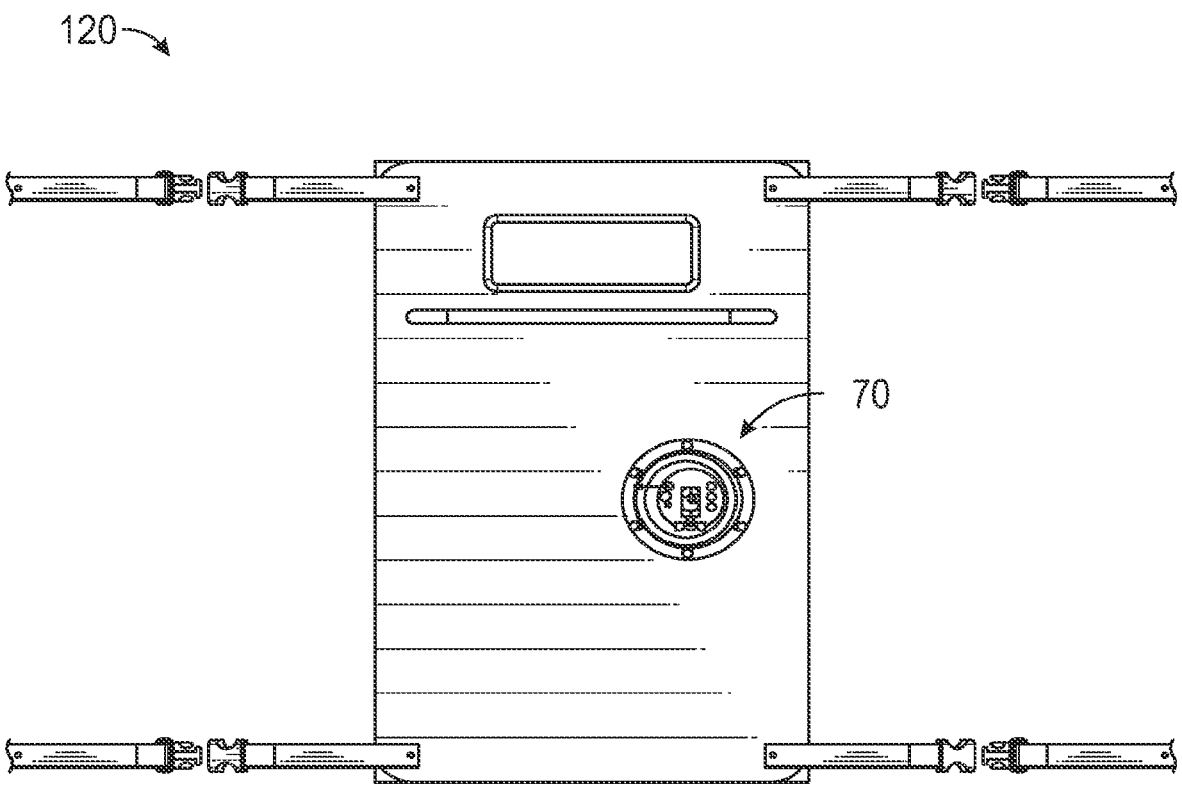
FIG. 14 is a partially exploded view of the ballistic shield of FIG. 12.

FIG. 13 is a front elevation view of a shield 120 employing a tactical turret according to an embodiment of the disclosure. FIG. 14 is a rear elevation view of a shield 120 employing a tactical turret according to an embodiment of the disclosure.

While a shield 120 is shown, it should be understood that the tactical turret 70 may be mounted in any number of other systems, including but not limited to windows, doors, walls, barricades, and the like, without departing from the scope of the disclosure.

Shield 120 may further include a device that can geolocate its position and then provide that position via a second electronic signal. For example, the shield 120 may include a transmitter that is capable of receiving signals from the Global Positioning System (GPS) and then transmitting the location of the shield 120 to a distant receiver. The transmitter may be a commercially available GPS tracking device or a custom-built device that is structured and configured to integrate with the shield 120 without interfering with the operation of the shield. By providing location information, a user of the shield 120 can be accounted for in a crisis situation.

Although the present disclosure has been described with reference to preferred embodiments, workers skilled in the art will recognize that changes may be made in form and detail without departing from the spirit and scope of the various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

I claim:

1. A ball turret, comprising:
   a turret shell having a rear portion and a front portion, the rear portion and the front portion assembled to form the turret shell;
   a GPS tracking receiver and transmitter;
   a block assembly configured to mount to a mounting element of a weapon system;
   a yoke carriage assembly configured to receive and mount to the block assembly; and
   a plurality of guide rods within the turret shell, the guide rods configured to mount the yoke carriage assembly thereto and to provide a recoil shock absorber in response to a discharge of the weapon system, the yoke carriage assembly releasably mounted to the block assembly.

2. The ball turret of claim 1 wherein the GPS tracking receiver and transmitter is configured to receive a signal from a Global Positioning System.

3. The ball turret of claim 1 wherein the GPS tracking receiver and transmitter is configured to calculate a global location of the ball turret.

4. The ball turret of claim 3 wherein the GPS tracking receiver and transmitter is configured to transmit a second electronic signal comprising the global location to a distant receiver.

* * * * *